US012704867B2

(12) United States Patent
Thakur

(10) Patent No.: US 12,704,867 B2
(45) Date of Patent: Aug. 11, 2026

(54) LOW DROPOUT REGULATOR WITH RESISTIVE DEVICE

(71) Applicant: Renesas Electronics Corporation, Tokyo (JP)

(72) Inventor: Nishant Singh Thakur, Broxbourne (GB)

(73) Assignee: Renesas Electronics Corporation, Tokyo (JP)

( * ) Notice: Subject to any disclaimer, the term of this patent is extended or adjusted under 35 U.S.C. 154(b) by 292 days.

(21) Appl. No.: 18/083,229

(22) Filed: Dec. 16, 2022

(65) Prior Publication Data

US 2024/0201721 A1 Jun. 20, 2024

(51) Int. Cl.
*G05F 1/575* (2006.01)
*G05F 1/46* (2006.01)
*G05F 1/565* (2006.01)

(52) U.S. Cl.
CPC .............. *G05F 1/575* (2013.01); *G05F 1/462* (2013.01); *G05F 1/565* (2013.01)

(58) Field of Classification Search
CPC . G05F 1/561; G05F 1/56; G05F 1/575; G05F 1/565; G05F 1/46; G05F 1/461; G05F 1/462
See application file for complete search history.

(56) References Cited

U.S. PATENT DOCUMENTS

| | | | | |
|---|---|---|---|---|
| 5,506,496 | A * | 4/1996 | Wrathall | G05F 3/20 323/317 |
| 10,254,778 | B1 * | 4/2019 | Sambucco | G05F 1/565 |
| 2004/0046532 | A1 * | 3/2004 | Menegoli | G05F 3/262 323/273 |
| 2008/0157735 | A1 * | 7/2008 | Liu | G05F 1/575 323/280 |
| 2010/0289472 | A1 * | 11/2010 | Renous | G05F 1/575 323/282 |
| 2018/0284829 | A1 * | 10/2018 | Hussien | H02P 9/30 |
| 2019/0187734 | A1 * | 6/2019 | Kim | H03F 3/45475 |
| 2020/0272186 | A1 * | 8/2020 | Inoue | G05F 1/563 |
| 2022/0043471 | A1 * | 2/2022 | Guiraud | G05F 1/575 |
| 2024/0004412 | A1 * | 1/2024 | Zhang | G05F 1/59 |
| 2024/0275375 | A1 * | 8/2024 | Abesingha | H03K 17/687 |

* cited by examiner

*Primary Examiner* — Gustavo A Rosario-Benitez
(74) *Attorney, Agent, or Firm* — SCULLY, SCOTT, MURPHY & PRESSER, P.C.

(57) ABSTRACT

A low dropout regulator for providing an output voltage, the low dropout regulator comprising a resistive device configured to contribute to the stability of the low dropout regulator during operation and to have a resistance that is dependent on a load current.

14 Claims, 22 Drawing Sheets

LOW DROPOUT REGULATOR WITH RESISTIVE DEVICE

The present disclosure relates to a low dropout regulator (LDO). In particular, the present disclosure relates to an LDO having a resistive device that contributes to the stability of the LDO during operation.

BACKGROUND

FIG. 1(*a*) is a schematic of a known low dropout regulator (LDO) 100. The LDO 100 comprises an amplifier 102, resistors 104, 106, a transistor 108, a capacitor 110 and a load capacitor 112. The load capacitor 112 has an equivalent series resistance (ESR) 114. The LDO 100 provides an output voltage Vout.

Physically implemented electrical components such as capacitors and inductors do not solely provide a capacitance and inductance, respectively, but also include a resistance component. These non-ideal physical components may be represented by an idealised capacitor or inductor in series with a resistor that is referred to as an equivalent series resistance (ESR). The ESR is representative of the resistance contribution of the non-ideal component. As such, it will be appreciated that an ESR is not a physical component itself, but may be used to describe or otherwise model the characteristics of a practical implementation of inductors or capacitors.

Traditionally LDO's have load capacitors with an ESR, but an ESR can cause poor load transients. That said, an ESR does provide benefits in helping the in stabilization of the analogue feedback loop of the LDO and therefore its presence is desirable.

In operation, if a current ΔI is provided to the output capacitor 112 it generates a ΔV voltage jump across ESR 114 and this information is fed back to the amplifier 102.

This creates a left half plane zero in the transfer function of the amplifier 102, which helps in improving the phase margin of the feedback loop and hence makes LDO 100 more stable.

The feedback loop is provided by the amplifier 102, the transistor 108 and the resistors 104, 106, which provides the feedback voltage Vfb to the amplifier 102, which in turn provides an output to the transistor 108 that is dependent on the feedback voltage Vfb and the reference Vref. The operation of such a feedback loop will be well-known by the skilled person.

The capacitor 110 cancels the pole at the input of the amplifier 102 created by the feedback divider (formed by the resistors 104, 106) and an input capacitance of the amplifier 102.

In summary, a larger ESR results in a larger load transient with a large voltage drop, however results in better stability. The ESR adds a zero into the system.

FIG. 1(*b*) is a schematic of a further known low dropout regulator (LDO) 116. This illustrates an alternative method of providing the effects of an ESR to aid stability.

In the present example, the capacitor 110 does not have a significant ESR. This may occur, for example, if the impact of the ESR of a component is negligible. In such a case it may be desirable to add a resistance to the circuit to provide the function of the ESR, which may be referred to as a pseudo-ESR. In the present example, this is provided by a poly resistor 118.

If ΔI current is dumped into the output capacitor 112 it generates a ΔV voltage jump across the pseudo-ESR 118 and this information is fed back to the amplifier 102. As for the LDO 100, in the present example we have zero in the loop transfer function.

This poly resistor 118 will have a direct current (DC) internal resistance (IR) drop across it, so load regulation will be much worse than having a real ESR as provided in the LDO 100. As the load current changes, the DC voltage drop across the poly resistor 118 will change creating an error in the feedback resistive ladder 104, 106 because the circuit does not accurately monitor the output voltage Vout. In summary, in this location, the ESR added by the user can keep the system stable but the ESR will make the DC accuracy of the LDO 100 worse.

As discussed previously, the capacitor 110 cancels the pole at the input of the amplifier 102 created by the feedback divider (104, 106) and the input capacitance of the amplifier 102.

FIG. 1(*c*) is a schematic of a further known low dropout regulator (LDO) 118. This is an advancement on the LDO 116 shown in FIG. 1(*b*), where the circuit has been adapted to remove the IR drop issue. The LDO 118 comprises a pseudo-ESR 120 and a transistor 122. The pseudo-ESR 120 provides the same zero location as with the actual ESR of FIG. 1(*a*). No DC IR drop is present in the current example, this leads to better load regulation than FIG. 1(*b*). Furthermore, the load transient is better than actual ESR of FIG. 1(*a*). Load regulation is the same as with actual ESR of FIG. 1(*a*).

The capacitor 110 is moved to a pseudo-ESR MOS terminal allowing feedforward of ΔV voltage jump created across pseudo-ESR 120. The capacitor 110 still cancels the pole at the input of the amplifier created by the feedback divider (104, 106) and input capacitance of the amplifier 102. The present implementation takes no extra current when compared with the earlier examples.

FIG. 2(*a*) shows a graph 200 showing an output voltage (Vout) versus time (t) and a graph 201 showing a load current (Iload) versus time (t) when a load transient occurs at a time 202.

A load transient typically refers to a sudden variation in a load current Iload that can lead to a sudden change in the output voltage Vout after which the system compensates and returns to its initial output voltage. It is desirable to minimise the effects of the load transient by minimising the variation in output voltage Vout and to have it return to its initial value as fast as possible.

A transfer function may be used to model a system to determine its outputs in response to inputs. A bode plot, as derived from the transfer function, may be used to illustrate the system's gain response versus frequency and phase response versus frequency.

FIG. 2(*b*) shows a bode plot 204 for the LDO 100 of FIG. 1(*a*) operating with a 10 mA load current, and FIG. 2(*b*) shows a bode plot 206 for the LDO 100 of FIG. 1(*a*) operating with a 1 nA load current.

For a given frequency, when there is 0° (−360°) phase between input and output signals, and the gain is greater than 1, there is an instability. Phase should ideally be between −90 and −180 when the gain is greater than 1.

"Phase margin" is the phase difference away from instability. It is desirable to have a phase margin greater than zero for stability and this can be achieved by adjusting poles and zeroes of the system. With reference to the bode plots, a gain of OdB denotes a unity gain.

It can be observed with reference to the bode plot 204 that for a load current of 10 mA there is a stable system over the whole frequency range. Specifically, at the point where the gain is unity, the phase margin is 90° and the system is stable.

However, with reference to the bode plot 206 which shows the system operating with a load current of 1 nA, the system is not stable over the whole frequency range. Specifically, at the point where the gain is unity, the phase margin can range from between 0° to 45° which is indicative of an unstable system.

Although illustrated for the LDO of FIG. 1(*a*), the LDO's of FIG. 1(*b*) and FIG. 1(*c*) will illustrate similar characteristics.

SUMMARY

It is desirable to provide a low dropout regulator that is stable over a larger range of load currents than as provided by known systems.

According to a first aspect of the disclosure there is provided a low dropout regulator for providing an output voltage, the low dropout regulator comprising a resistive device configured to contribute to the stability of the low dropout regulator during operation and to have a resistance that is dependent on a load current.

Optionally, the low dropout regulator comprises a first amplifier comprising a first input terminal for receiving a reference voltage, a second input terminal for receiving a feedback voltage, and an output terminal, and a regulator transistor comprising a gate terminal coupled to the output terminal of the first amplifier.

Optionally, the low dropout regulator comprises a first resistive element, and a second resistive element, wherein the regulator transistor, the first resistive element and the second resistive element are coupled in series, the regulator transistor and the first resistive element are coupled at an output node for providing the output voltage, the first resistive element and the second resistive element are coupled at a feedback node for providing the feedback voltage, the feedback node being coupled to the second input terminal of the first amplifier, the regulator transistor is coupled to a first voltage terminal, and the second resistive element is coupled to a second voltage terminal.

Optionally, the low dropout regulator comprises a first capacitor coupled to the second input terminal of the first amplifier and configured to contribute to the stability of the low dropout regulator during operation.

Optionally, the first capacitor is configured to contribute to the stability of the low dropout regulator during operation by cancelling a pole at the second input terminal of the amplifier.

Optionally, the low dropout regulator comprises a load device coupled to the output node, the load current being provided across the load device during operation.

Optionally, the load device comprises a first terminal coupled to the output node and a second terminal coupled to the second voltage terminal.

Optionally, the load device comprises a load capacitor.

Optionally, the resistive device comprises a first negative threshold transistor.

Optionally, the resistive device comprises a first transistor coupled in series with the first negative threshold transistor.

Optionally, the resistive device comprises a second transistor coupled in series with a second negative threshold transistor, the series coupling of the first negative threshold transistor and the first transistor being coupled in parallel with the series coupling of the second negative threshold transistor and the second transistor.

Optionally, the resistive device is coupled to the output node, the output terminal of the first amplifier and the first voltage terminal.

Optionally, the resistive device comprises a first negative threshold transistor.

Optionally, the resistive device comprises a first transistor coupled in series with the first negative threshold transistor.

Optionally, the first negative threshold transistor comprises a first terminal coupled to the output node and a second terminal coupled to a first terminal of the first transistor.

Optionally, the first transistor comprises a second terminal coupled to the first voltage terminal and a gate terminal coupled to the output terminal of the first amplifier.

Optionally, the low dropout regulator comprises a first capacitor having a first terminal coupled to the second input terminal of the first amplifier and configured to contribute to the stability of the low dropout regulator during operation.

Optionally, the first capacitor is configured to contribute to the stability of the low dropout regulator during operation by cancelling a pole at the second input terminal of the amplifier.

Optionally, the first capacitor having a second terminal coupled to the second terminal of the first negative threshold transistor.

Optionally, the low dropout regulator comprises a load device coupled to the output node, the load current being provided across the load device during operation.

Optionally, the load device comprises a first terminal coupled to the output node and a second terminal coupled to the second voltage terminal.

Optionally, the load device comprises a load capacitor.

Optionally, the resistive device comprises a second transistor coupled in series with a second negative threshold transistor, the series coupling of the first negative threshold transistor and the first transistor being coupled in parallel with the series coupling of the second negative threshold transistor and the second transistor.

Optionally, the second negative threshold transistor comprises a first terminal coupled to the output node and a second terminal coupled to a first terminal of the second transistor.

Optionally, the second transistor comprises a second terminal coupled to the first voltage terminal and a gate terminal coupled to the output terminal of the first amplifier.

Optionally, the second terminal of the second negative threshold transistor is coupled to the first terminal of the second transistor via a third resistive element and/or the first terminal of the second transistor is coupled to the output node via a fourth resistive element.

According to a second aspect of the disclosure there is provided a method of providing an output voltage, comprising providing a low dropout regulator for providing an output voltage, wherein the low dropout regulator comprises a resistive device configured to contribute to the stability of the low dropout regulator during operation and to have a resistance that is dependent on a load current.

It will be appreciated that the method of the second aspect may include providing and/or using features set out in the first aspect and can incorporate other features as described herein.

BRIEF DESCRIPTION OF THE DRAWINGS

The disclosure is described in further detail below by way of example and with reference to the accompanying drawings, in which.

DETAILED DESCRIPTION

Figure 3A:
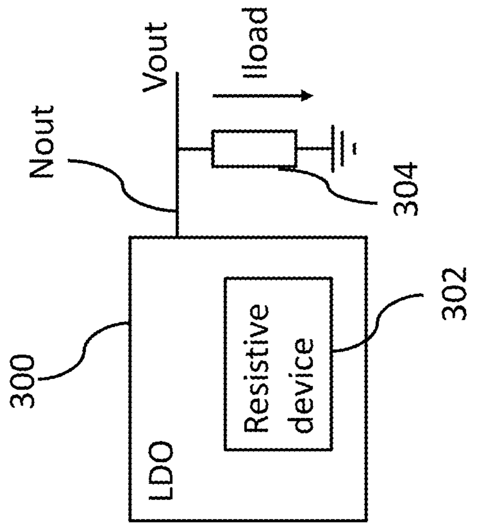
FIG. 3(*a*) is a schematic of an LDO in accordance with a first embodiment of the present disclosure, FIG. 3(*b*) is a schematic of an example embodiment of a resistive device, FIG. 3(*c*) is a schematic of a further example embodiment of the resistive device.
Figure 3B:
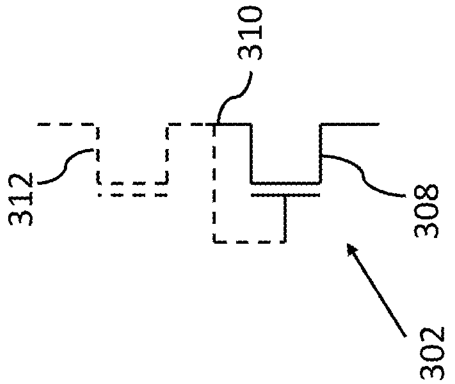
Figure 3C:
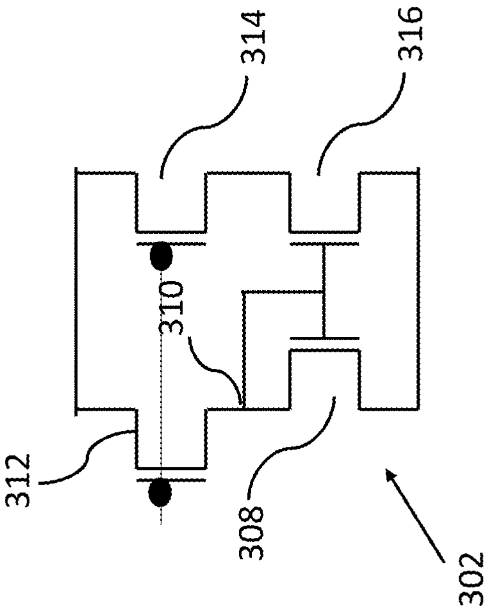

FIG. 3(*a*) is a schematic of a low dropout regulator (LDO) 300 for providing an output voltage Vout in accordance with a first embodiment of the present disclosure.

The LDO 300 comprises a resistive device 302 configured to contribute to the stability of the LDO 300 during operation and to have a resistance that is dependent on a load current Iload.

There is also shown a load device 304 coupled to an output node Nout, with the load current Iload being provided across the load device 304 during operation.

The resistive device 302 may function as a pseudo-ESR as described previously, for example by providing a zero in the transfer function of the LDO 300. Furthermore, the resistive device 302 may also function to reduce the impact of load transients, as discussed previously in relation to the ESR and pseudo-ESR.

As the resistive device 302 has a resistance that is dependent on the load current Iload, stability can be maintained over a larger load current range than as provided by known systems. This effectively provides an "adaptive ESR". Specifically, the LDO's of FIGS. 1(*a*)-(*c*) provide a fixed zero, meaning that the circuit may become unstable depending on the load current. With reference to FIG. 2(*b*) it can be observed that a fixed zero can lead to instability over a load current range.

Figure 1A:
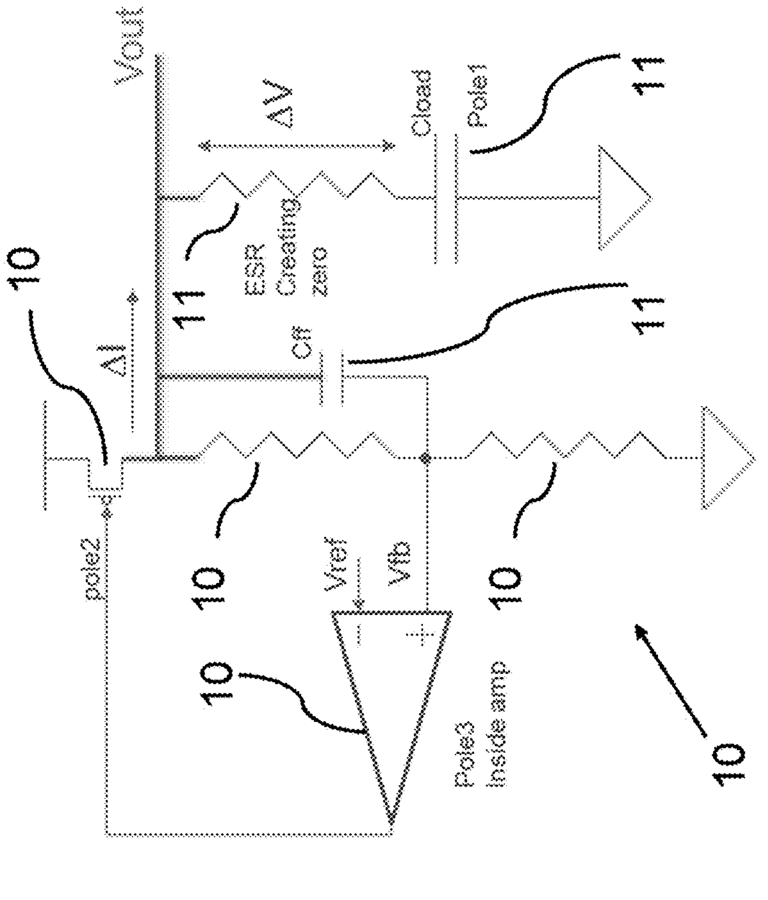
FIG. 1(*a*) is a schematic of a known low dropout regulator (LDO), FIG. 1(*b*) is a schematic of a further known LDO, FIG. 1(*c*) is a schematic of a further known LDO.
Figure 1B:
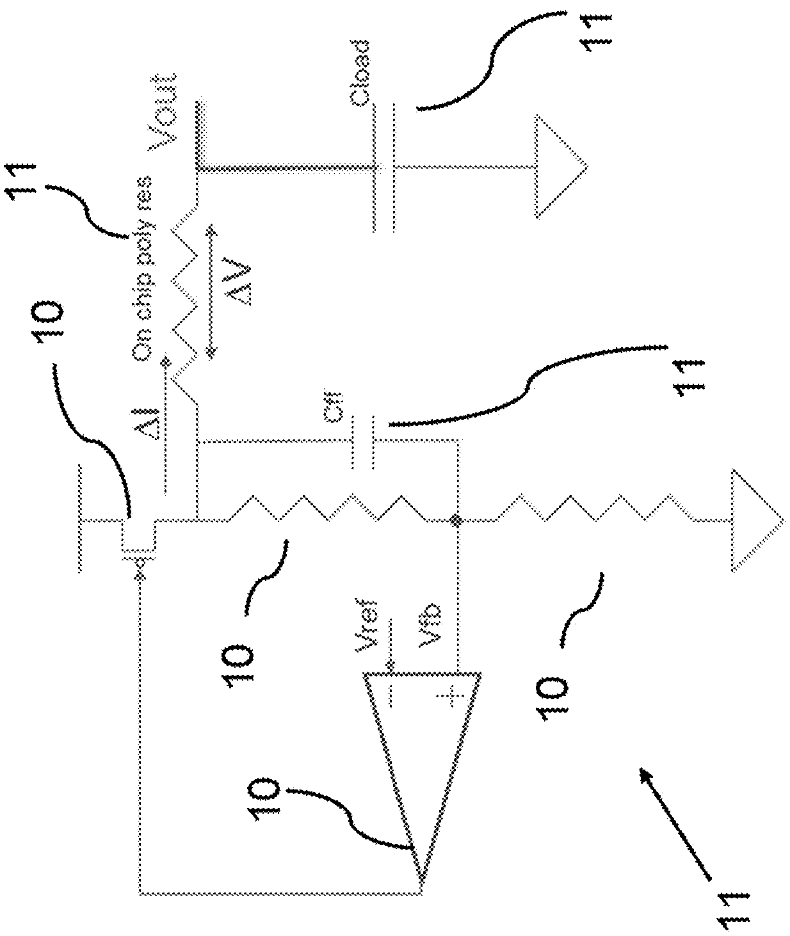
Figure 1C:
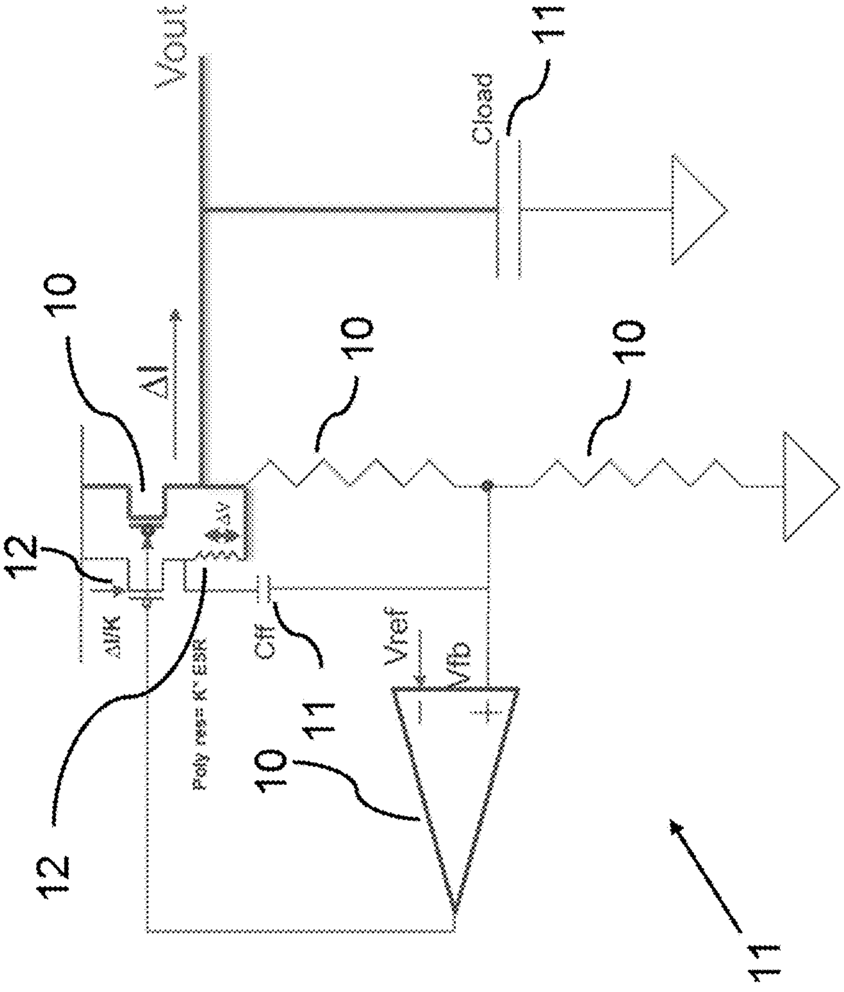
Figure 2A:
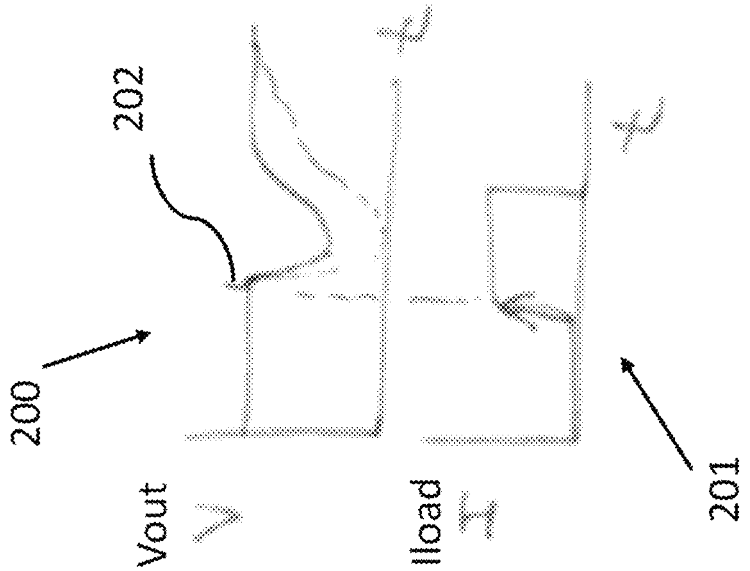
FIG. 2(*a*) shows a graph showing an output voltage versus time and a graph showing a load current versus time, FIG. 2(*b*) shows bode plots for the LDO of FIG. 1(*a*) operating with different load currents.
Figure 2B:
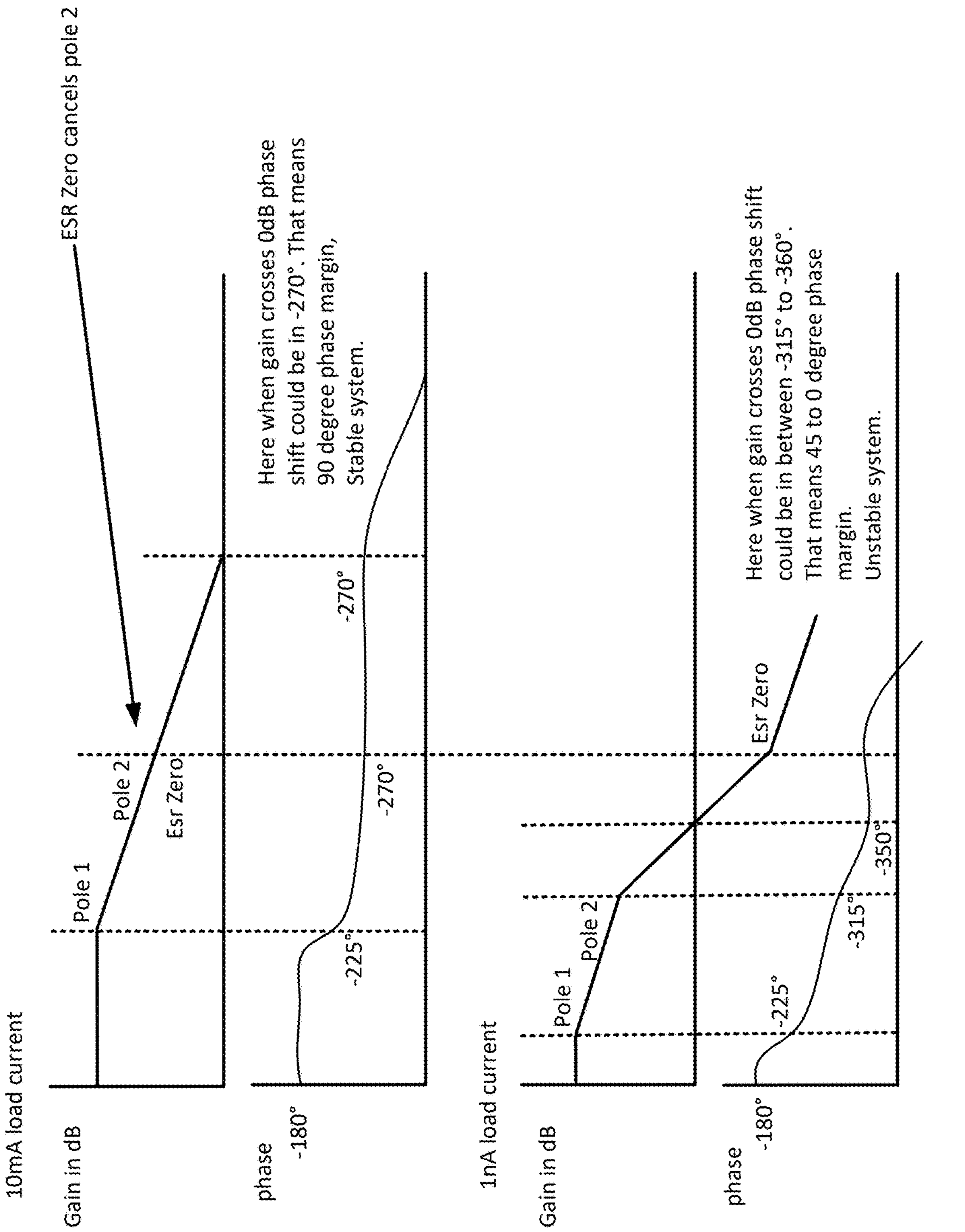

In embodiments disclosed herein, the resistance of the resistive device 302, functioning as a pseudo-ESR, can be adjusted in response to a different load current, such that the zero is adaptive and the LDO 300 can remain stable over a larger load current range than provided by the systems of FIG. 1(*a*)-(*c*).

In summary, a fixed pseudo-ESR is not very helpful for a large load current dynamic range LDO because it will only provide a fixed frequency zero in the loop transfer function.

When a load of LDO current increases, other poles and zeros of the system will move to a higher frequency. If the zero provided by the ESR or pseudo-ESR can move with them to a higher frequency, we can achieve a high phase margin which guarantees the system remains stable. This functionality is provided by the adaptive ESR of the resistive device 302 of the present disclosure.

FIG. 3(*b*) is a schematic of an example embodiment of the resistive device 302. In the present embodiment, the resistive device 302 comprises a negative threshold transistor 308. The negative threshold transistor 308 may have its gate coupled to a terminal 310. The resistive device 302 may further comprise a transistor 312 that is coupled in series with the negative threshold transistor 308.

The negative threshold transistor 308 may be an NMOS or PMOS transistor in accordance with the understanding of the skilled person. The transistor 312 may be an NMOS or PMOS transistor in accordance with the understanding of the skilled person. In the present embodiment, the negative threshold transistor 308 may be an NMOS transistor and the transistor 312 may be a PMOS transistor.

FIG. 3(*c*) is a schematic of a further example embodiment of the resistive device 302. In the present embodiment, the resistive device comprises a transistor 314 coupled in series with a negative threshold transistor 316. The transistors 314, 316 are coupled in parallel with the transistors 308, 312. The gates of the transistors 308, 316 may be coupled.

The negative threshold transistors 308 and 316 may be an NMOS or PMOS transistor in accordance with the understanding of the skilled person. The transistors 312 and 314 may be an NMOS or PMOS transistor in accordance with the understanding of the skilled person. In the present embodiment, the negative threshold transistors 308 and 316 may be an NMOS transistor and the transistors 312 and 314 may be a PMOS transistor.

Figure 4A:
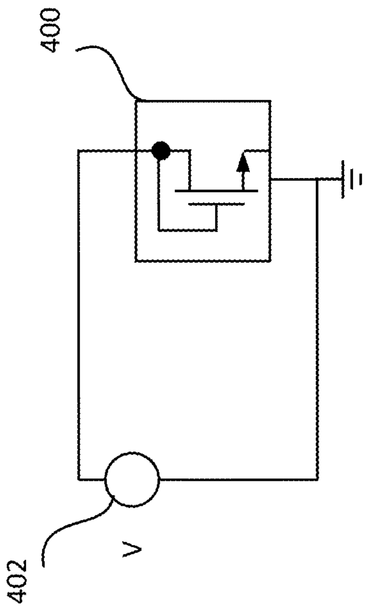
FIG. 4(*a*) is a schematic of a negative threshold transistor being coupled to a voltage source, FIG. 4(*b*) is a graph showing a resistance of the negative threshold transistor as the current varies, FIG. 4(*c*) is a graph showing the relationship between resistance and current for the embodiment presented in FIG. 3(*b*) and for the embodiment presented in FIG. 3(*c*)
Figure 4B:
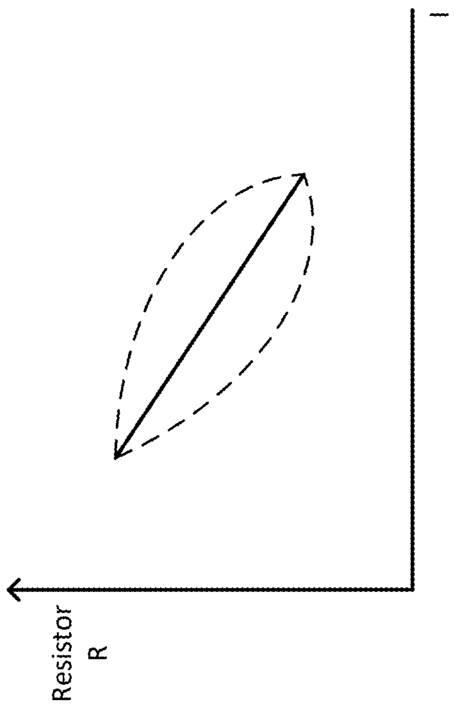
Figure 4C:
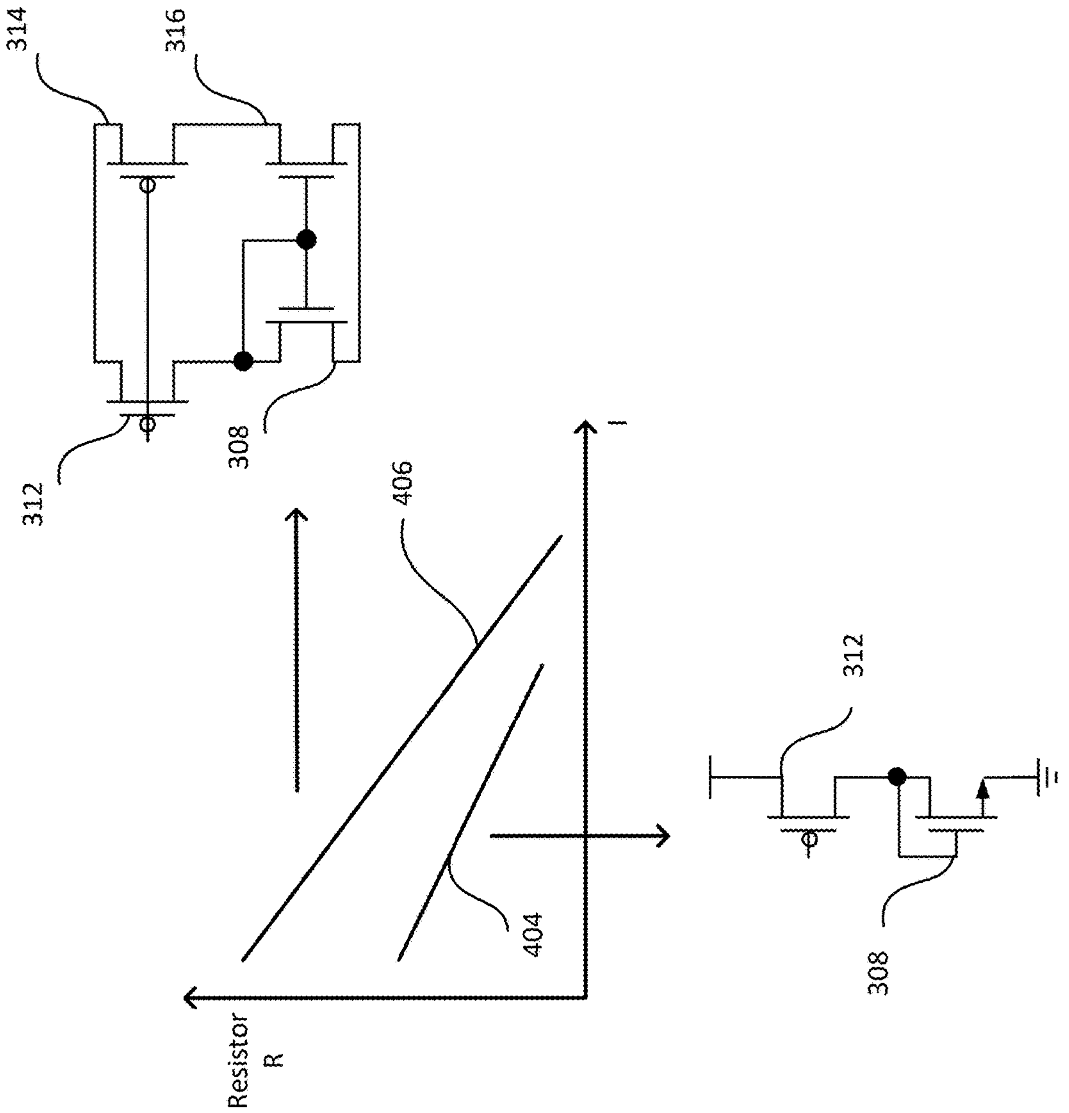

A negative threshold transistor, such as the transistor 308, exhibits a current dependent resistance. FIG. 4(*a*) is a schematic of a negative threshold transistor 400 being coupled to a voltage source 402. FIG. 4(*b*) is a graph showing a resistance R of the negative threshold transistor 400 as the current I varies. There is illustrated a central trace 402 of the resistance variation, with the dashed lines denoting a wider possible range of resistance characteristics due to possible variation in the performance of physical components. It will be appreciated that perfectly liner resistor characteristics are not essential and there should simply be suitable variation of resistance with current to let the zero move with load current.

As the resistance of a negative threshold transistor is current dependent, the embodiments shown in FIGS. 3(*b*) and (*c*) (and other embodiments described herein and in accordance with the understanding of the skilled person) can exhibit the required characteristics such that when the load current Iload increases, the resistance R reduces, thereby moving the zero to higher frequencies, and vice versa. Furthermore, this does not require additional current for operation.

By way of example, if the ESR zero can be moved to a lower frequency at a lower load current, we can cancel pole2 (as illustrated in FIG. 2(*b*)), and get a, for example, 90° phase margin and therefore a stable system. This functionality can be provided by the systems as disclosed herein.

In summary, the techniques disclosed herein provide a method for adding a pseudo-ESR without load transient degradation or DC load regulation degradation or taking extra quiescent current.

FIG. 4(*c*) is a graph showing the relationship between resistance R and current I for the embodiment presented in FIG. 3(*b*), as shown by a trace 404; and for the embodiment presented in FIG. 3(*c*), as shown by a trace 406. It can be observed that the embodiment presented in FIG. 3(*c*) can provide a wider range of resistance variation than that provided by FIG. 3(*b*).

A negative threshold transistor is a transistor that will conduct a current even when a voltage of 0V is applied across its gate and source. As discussed previously, for a negative threshold transistor, when load current increases, resistance reduces, which will move the zero to higher frequencies and vice versa. This means that for an LDO implementing the resistive device 302, the zero is at a lower frequency for lower load currents and moves to a higher frequency for higher load currents. This means that as load current increases the zero tracks other poles and zeroes of the system thereby achieving a high phase margin suitable for providing a stable system.

Figure 5A:
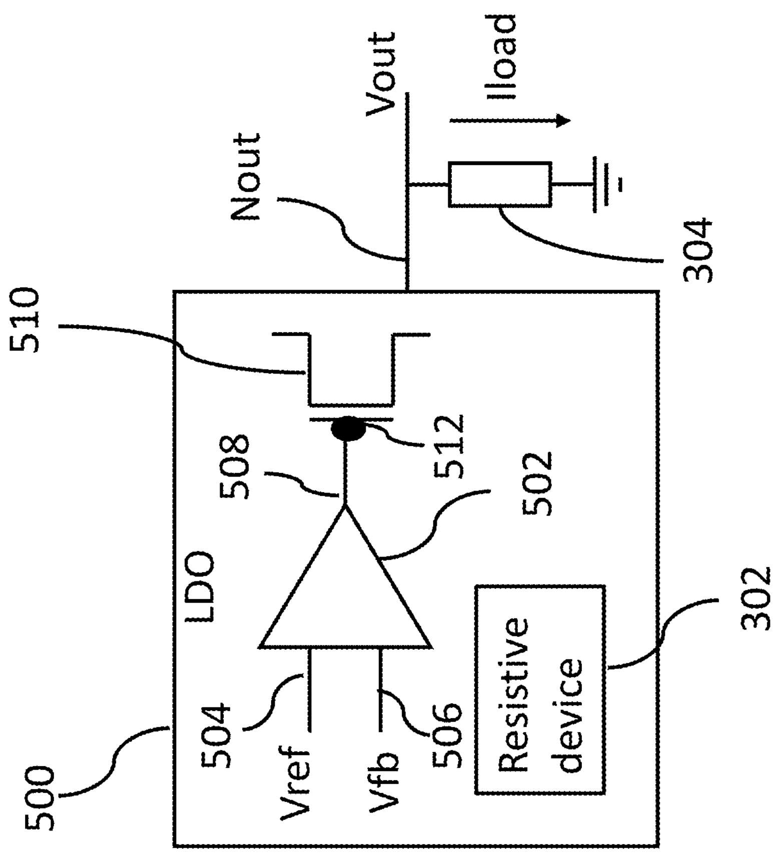
FIG. 5(*a*) is a schematic of an LDO in accordance with a second embodiment of the present disclosure, FIG. 5(*b*) is a schematic of an LDO in accordance with a third embodiment of the present disclosure.
Figure 5B:
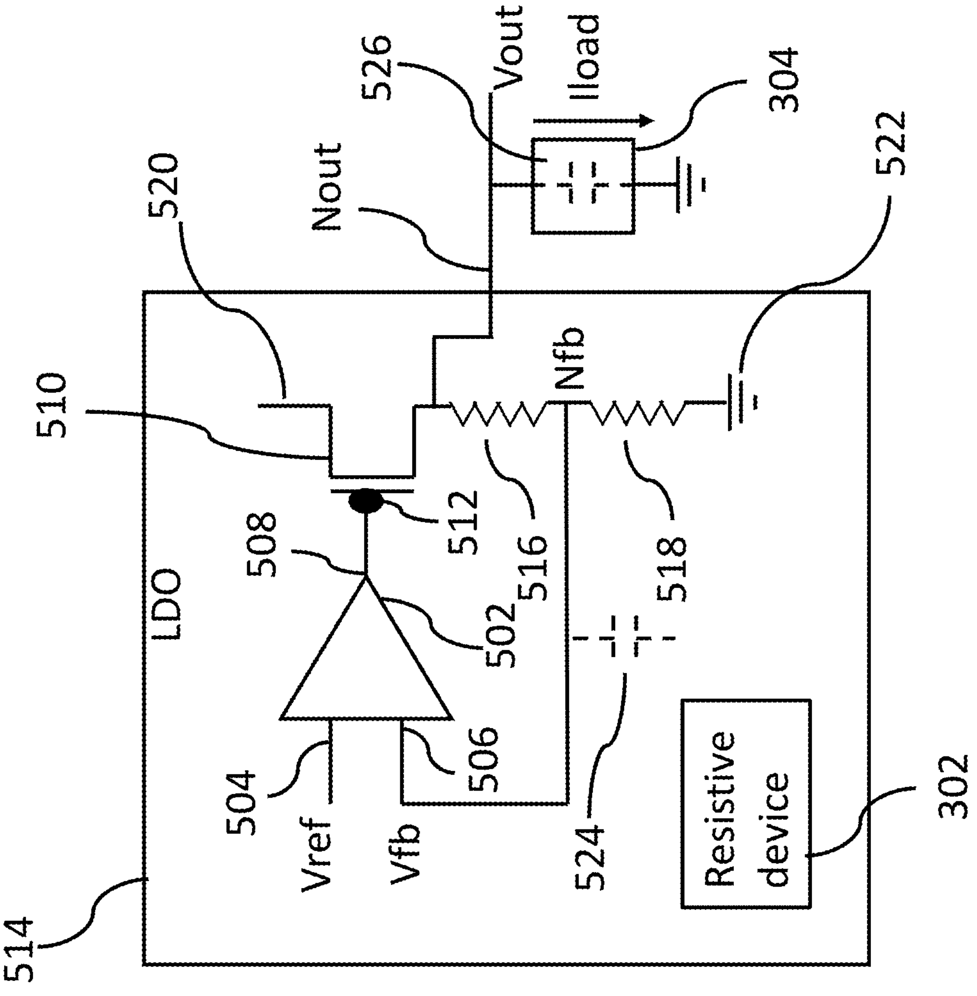

FIG. 5(*a*) is a schematic of an LDO 500 in accordance with a second embodiment of the present disclosure. The LDO 500 comprises an amplifier 502 comprising an input terminal 504 for receiving a reference voltage Vref, an input terminal 506 for receiving a feedback voltage Vfb, and an output terminal 508. The LDO 500 further comprises a regulator transistor 510 comprising a gate terminal 512 coupled to the output terminal 508 of the amplifier 502.

FIG. 5(*b*) is a schematic of an LDO 514 in accordance with a third embodiment of the present disclosure. The LDO 514 is as described for the LDO 500 and further comprises resistive elements 516, 518. The regulator transistor 510 and the resistive elements 516, 518 are coupled in series, with the regulator transistor 510 and the resistive element 516 being coupled at an output node Nout for providing the output voltage Vout.

The resistive elements 516, 518 are coupled at a feedback node Nfb for providing the feedback voltage Vfb. The feedback node Vfb is coupled to the input terminal 506 of the amplifier 502. The regulator transistor 510 is coupled to a voltage terminal 520 and the resistive element 518 is coupled to a voltage terminal 522.

In a further embodiment, the LDO 514 may comprise a capacitor 524 coupled to the input terminal 506 and being configured to contribute to the stability of the system, for example, as described for the capacitor 110. The capacitor 524 may cancel a pole at the input terminal 506.

The load device 304 may comprise a first terminal coupled to the output node Nout, and a second terminal coupled to the voltage terminal 522. The voltage terminal 522 may be a ground terminal. The load device 304 may comprise a load capacitor 526.

Figure 6A:
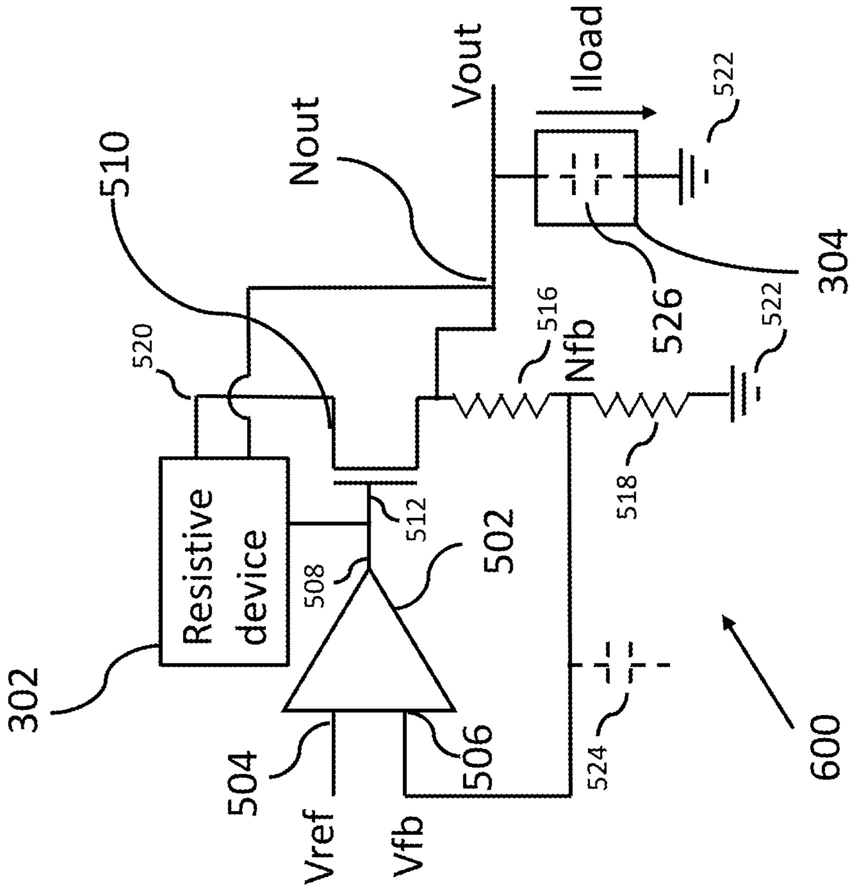
FIG. 6(*a*) is a schematic of an LDO in accordance with a fourth embodiment of the present disclosure, FIG. 6(*b*) is a schematic of an LDO in accordance with a fifth embodiment of the present disclosure.
Figure 6B:
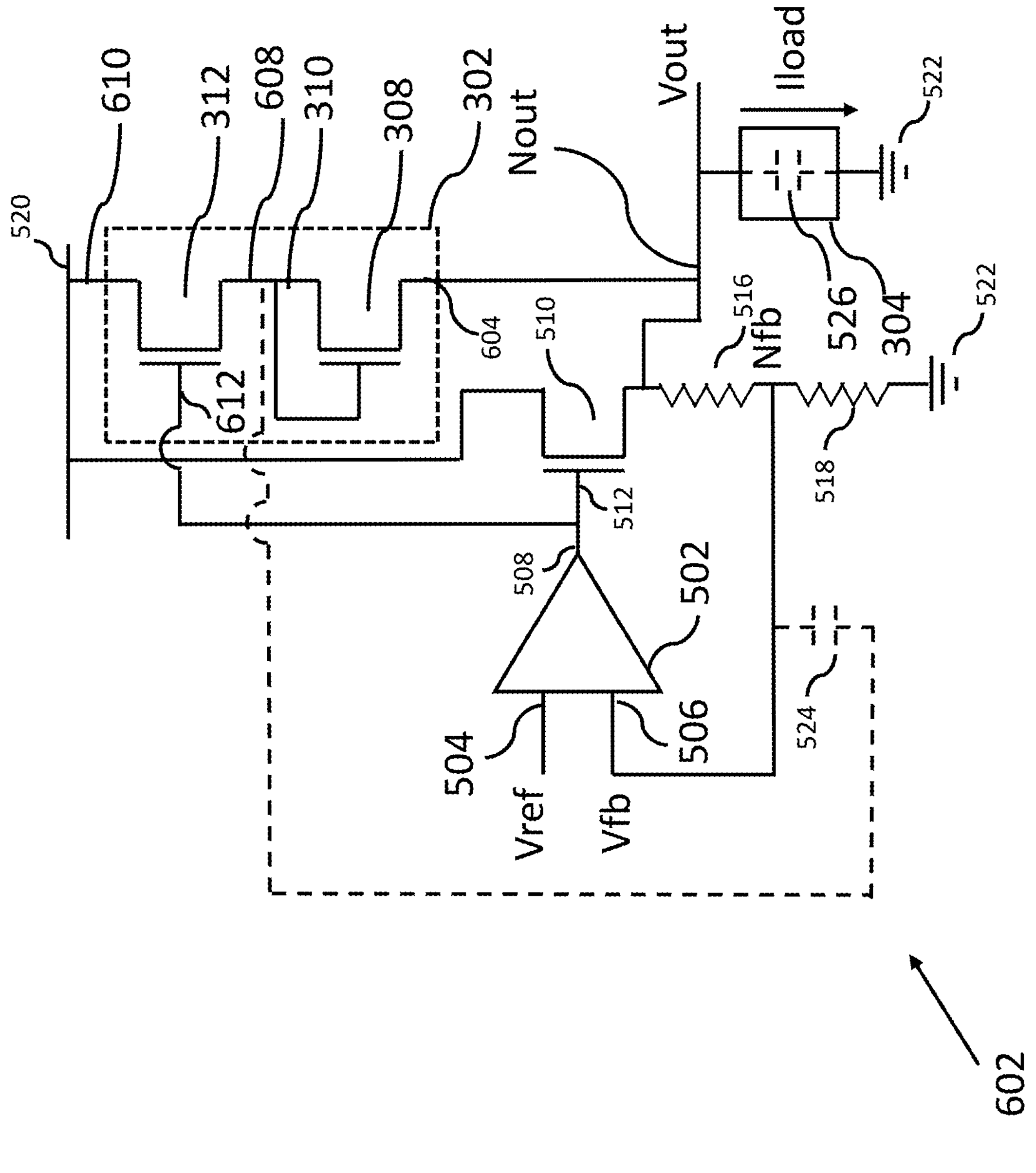

FIG. 6(*a*) is a schematic of an LDO 600 in accordance with a fourth embodiment of the present disclosure. In the present embodiment, the resistive device 302 is coupled to the output node Nout, the output terminal 508 of the amplifier 502 and the voltage terminal 520.

FIG. 6(*b*) is a schematic of an LDO 602 in accordance with a fifth embodiment of the present disclosure having a specific embodiment of the resistive device 302. The configuration of the resistive device 302 may be understood with reference to FIG. 3(*b*), and the accompanying description.

In the present embodiment, the negative threshold transistor 308 comprises a terminal 604 coupled to the output node Nout and the terminal 310 coupled to a terminal 608 of the transistor 312. The transistor 312 may comprise a terminal 610 coupled to the terminal 520 and a gate terminal 612 coupled to the output terminal 508. The capacitor 524 may be coupled to the terminal 310.

Figure 7A:
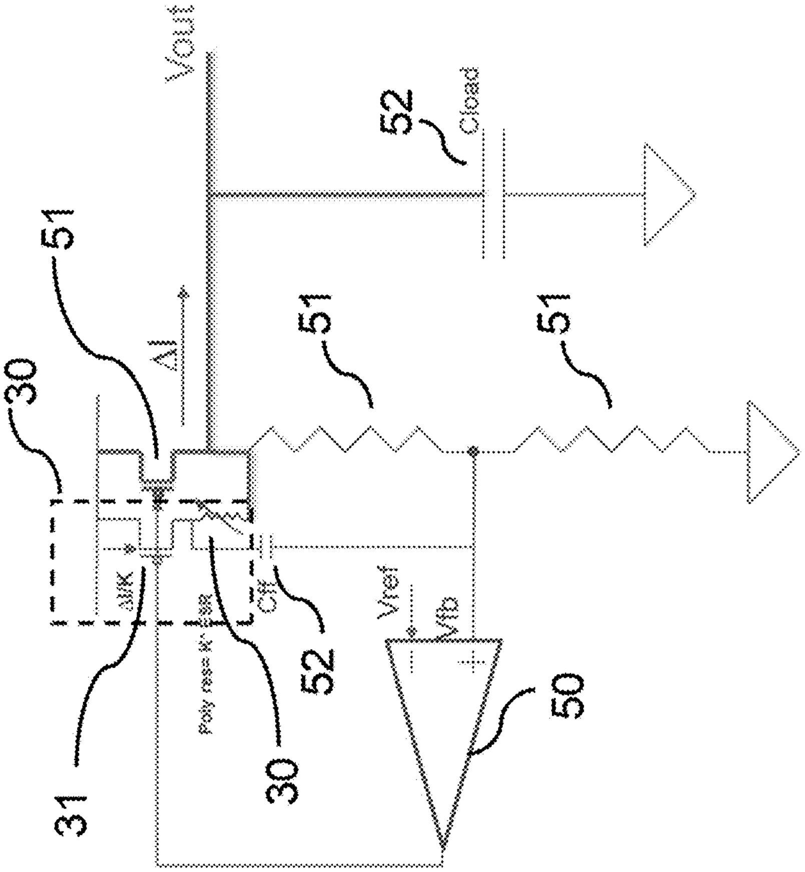
FIG. 7(*a*) is a schematic of an LDO in accordance with a sixth embodiment of the present disclosure, FIG. 7(*b*) is a graph showing a load transient for a known system and a system using adaptive ESR, FIG. 7(*c*) is a schematic of a specific embodiment of a resistive device.
Figure 7B:
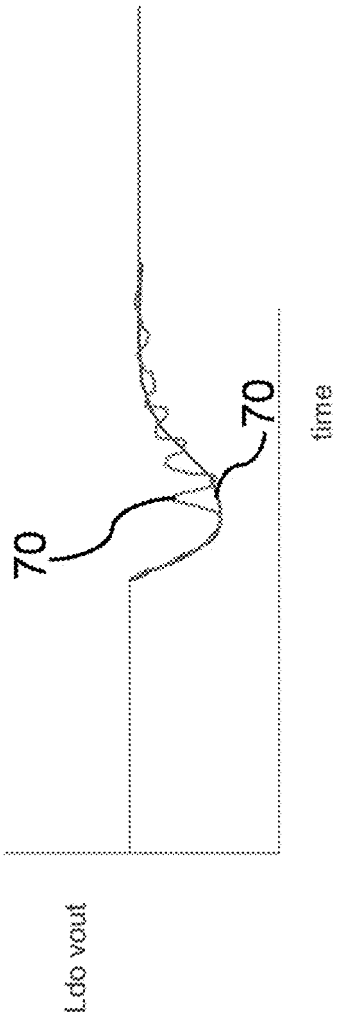
Figure 7C:
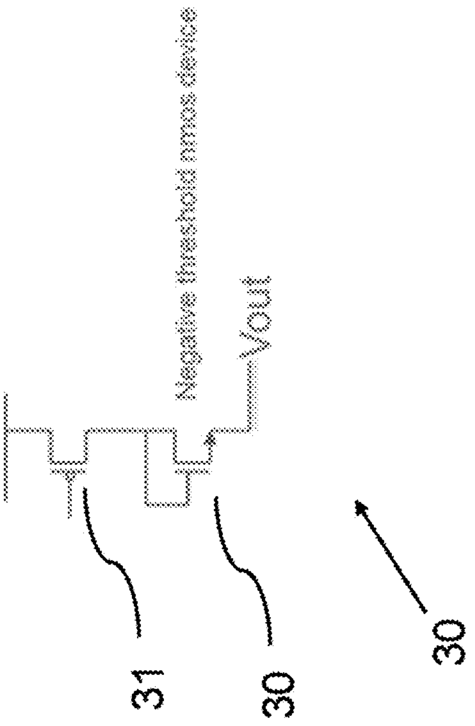

FIG. 7(*a*) is a schematic of an LDO 700 in accordance with a sixth embodiment of the present disclosure. It will be appreciated that some reference numerals have been omitted to aid in the clarity of the drawings.

As discussed previously, the resistive device 302 comprises a negative threshold transistor 308 to provide a resistance that is load current dependent. A NMOS transistor that does not function as a negative threshold transistor, will have a threshold voltage Vth drop and therefore can be used for this purpose only if LDO output voltage and input supply voltage are apart by at least Vth+Saturation voltage of the transistor 312 otherwise either device 312 will go into linear region of operation or device 308 will turn off. By using a negative threshold NMOS transistor 308, the drain-source voltage VDS of the transistor 312 is not crushed. This means that the transistor 312 will remain in saturation and thus correctly replicate a scaled-down current compared to the main device (the transistor 510). The transistor 312 may be a replica PMOS device.

FIG. 7(*b*) is a graph showing a load transient for a known system (for example as shown in FIG. 1(*a*)), shown by a trace 702; and a system using adaptive ESR (such as the system shown in FIG. 7(*a*), shown by a trace 704. We can see the trace 702 has lower overall phase margin and hence shows signs of unstable behaviour with ringing in output voltage whereas the trace 704 is stable FIG. 7(*c*) is a schematic of a specific embodiment of the resistive device 302.

Without adaptive ESR, the load transient will show a lot of ringing at the LDO output due to lower phase margin. Embodiments of the present disclosure can provide a clean trace having reduced ringing, or without ringing.

Figure 8A:
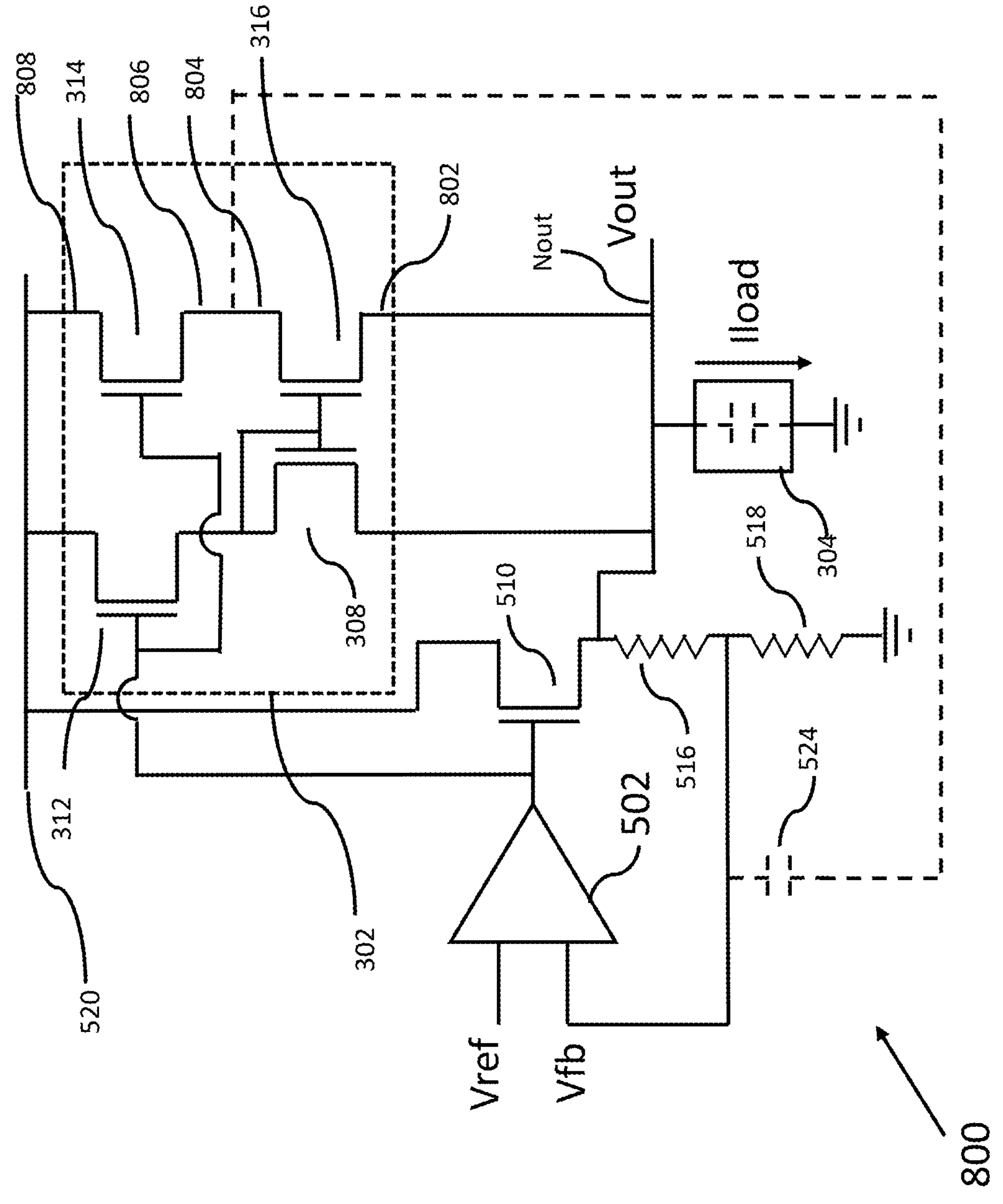
FIG. 8(*a*) is a schematic of an LDO in accordance with a seventh embodiment of the present disclosure, FIG. 8(*b*) is a schematic of a specific embodiment of a resistive device.
Figure 8B:
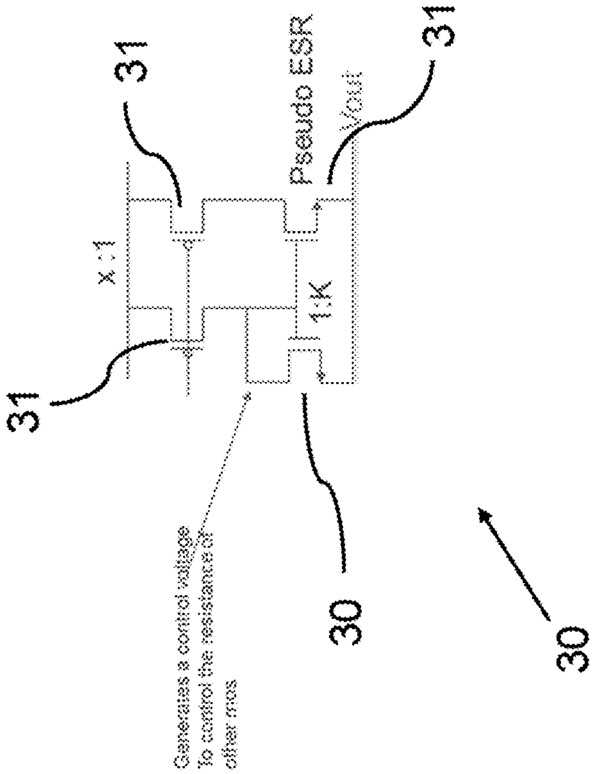

FIG. 8(*a*) is a schematic of an LDO 800 in accordance with a seventh embodiment of the present disclosure. It will be appreciated that some reference numerals have been omitted to aid in the clarity of the drawings. The configuration of the resistive device 302 may be understood with reference to FIG. 3(*c*), and the accompanying description.

In the present embodiment the negative threshold transistor 316 comprises a terminal 802 coupled to the output node Nout and a terminal 804 coupled to a terminal 806 of the transistor 314. The transistor 314 comprises a terminal 808 coupled to the voltage terminal 520 and a gate terminal 810 coupled to the terminal 508.

FIG. 8(*b*) is a schematic of a specific embodiment of the resistive device 302. The ratio 1:K as shown on FIG. 8(*b*) denotes the size ratio between the transistor 308 and the transistor 316. x:1 denotes the current ratio with a current flowing through the series combination of transistors 314, 316 being scaled by x when flowing through 312, 308. Value scaling factor K and X controls how fast resistance of 316 changes with load current hence they control the slope and range of resistance of 316 over the entire load current range.

Appropriately scaling the sizes of the transistors 308, 312, 314, 316 can provide a wider operational range, for example as shown by trace 406 in FIG. 4(*c*).

Figure 9A:
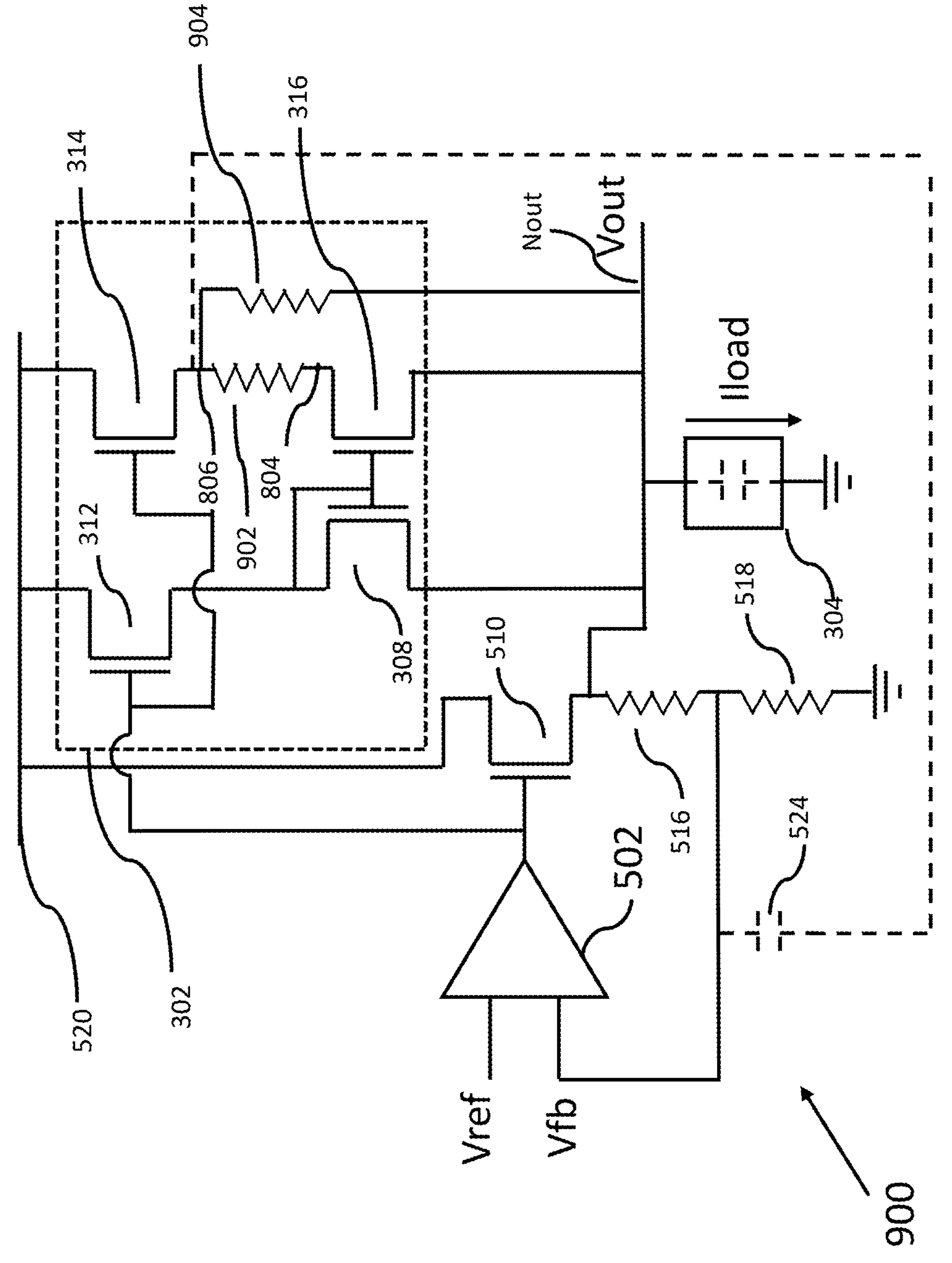
FIG. 9(*a*) is a schematic of an LDO in accordance with a eighth embodiment of the present disclosure, FIG. 9(*b*) is a schematic of a portion of an LDO, which illustrates an alternative embodiment of the LDO of FIG. 9(*a*), FIG. 9(*c*) is a schematic of a portion of an LDO, which illustrates an alternative embodiment of the LDO of FIG. 9(*b*)
Figure 9B:
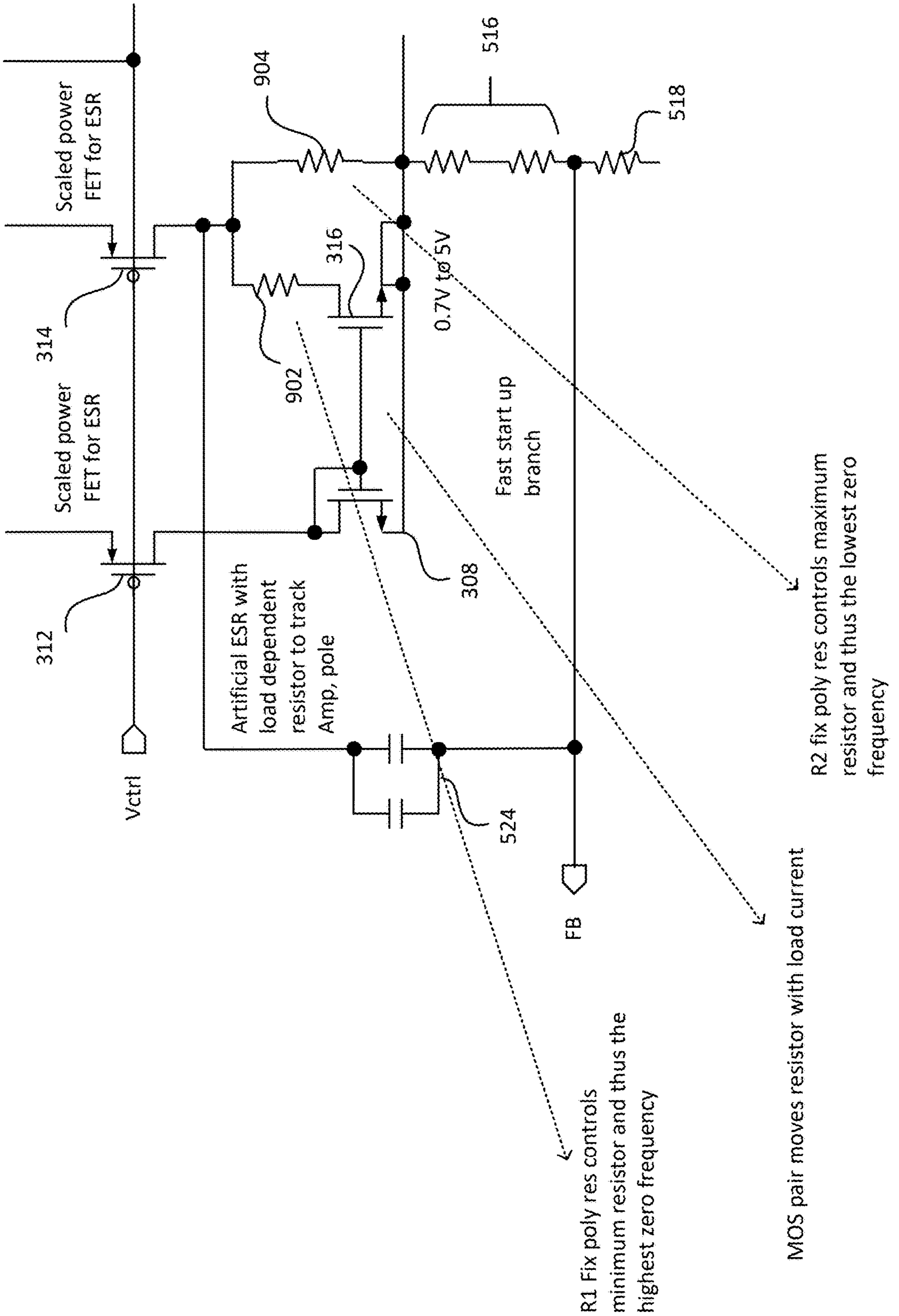
Figure 9C:
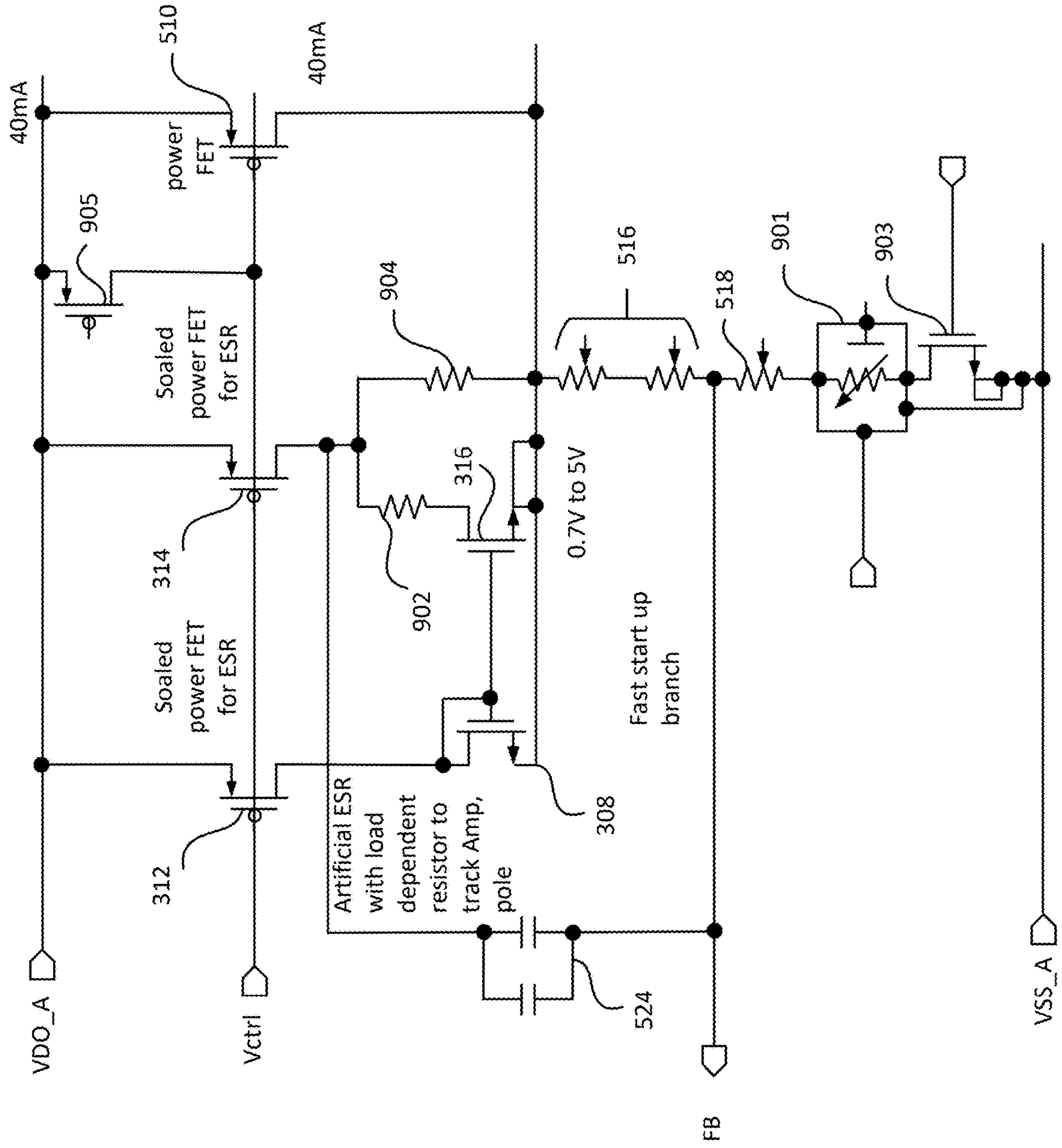

FIG. 9(*a*) is a schematic of an LDO 900 in accordance with a eighth embodiment of the present disclosure. It will be appreciated that some reference numerals have been omitted to aid in the clarity of the drawings.

In the present embodiment the terminal 804 of the negative threshold transistor 316 is coupled to the terminal 806 of the transistor 314 via a resistive element 902 and the terminal of the transistor 314 is coupled to the output node Nout via a resistive element 904. The resistive elements provide maximum and minimum resistances in the resistance range provided by the resistive device 302. This acts to set the lowest zero frequency and/or the highest zero frequency as provided by the resistive device 302.

It will be appreciated that a further embodiment may omit one of the resistive elements 902, 904 to provide only a maximum or minimum limiting function. The resistive element 902 provides the minimum resistance and thus controls the highest zero frequency. The resistive element 904 provides the maximum resistance and thus controls the lowest zero frequency.

FIG. 9(*b*) is a schematic of a portion of an LDO 906, which illustrates an alternative embodiment of the LDO 900. FIG. 9(*c*) is a schematic of a portion of an LDO 908, which illustrates an alternative embodiment of the LDO 906. The portion of the LDO 908 further comprises a variable resistor 901 and transistors 903, 905. It will be appreciated that some reference numerals have been omitted to aid in the clarity of the drawings.

Figure 10:
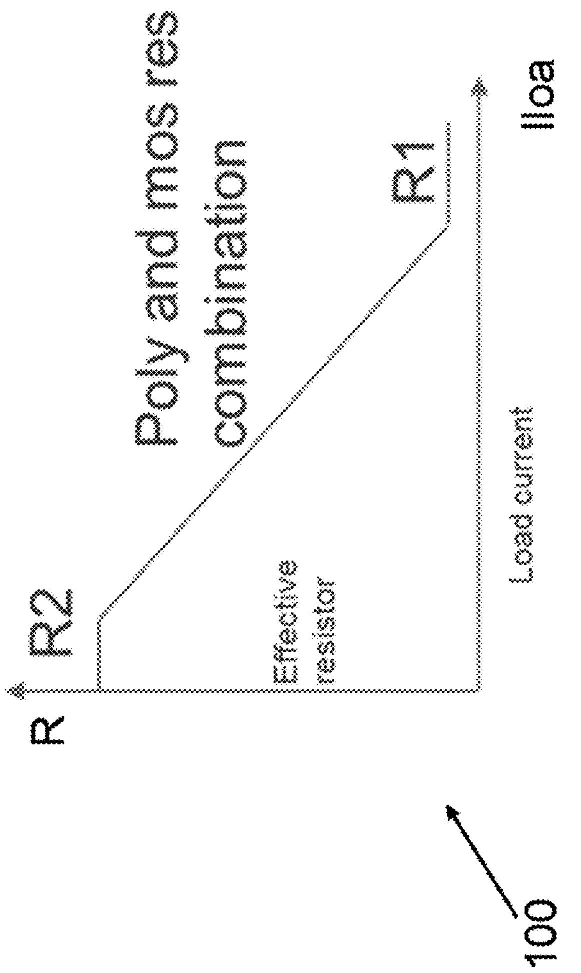
FIG. 10 is graph showing an example of the relationship between the resistance of the resistive device, with resistive elements to provide maximum and minimum resistances, versus the load current.

FIG. 10 is graph 1000 showing an example of the relationship between the resistance R of the resistive device 302 versus the load current Iload with resistive elements 902, 904, for example, as shown in FIGS. 9(*a*)-(*c*). R1 denotes the effect of resistive element 902 in providing a minimum resistance and R2 denotes the effect of the resistive element 904 in providing a maximum resistance.

Example operating parameters for an LDO in accordance with embodiments of the present disclosure, and in accordance with the understanding of the skilled person may be as follows:

Load current range is from 1 nA to 10 mA

Vin range Is 1.8V to 5.5V

Vout Is 0.7V to 5V

10 μF off-chip capacitor

Load pole is dominant

Common reference numerals or variables between Figures represent common features.

Various improvements and modifications may be made to the above without departing from the scope of the disclosure.

The invention claimed is:

1. A low dropout regulator for providing an output voltage, the low dropout regulator comprising:

- a resistive device configured to contribute to stability of the low dropout regulator during operation and to have a resistance that is dependent on a load current;
- a first resistive element;
- a second resistive element;
- a first amplifier;
- a regulator transistor; and
- a first capacitor,
- wherein:
- the first resistive element and the second resistive element are coupled in series;
- the regulator transistor and the first resistive element are coupled at an output node for providing the output voltage;
- the first resistive element and the second resistive element are coupled at a feedback node for providing a feedback voltage, the feedback node being coupled to a second input terminal of the first amplifier;
- the regulator transistor is coupled to a first voltage terminal;
- the second resistive element is coupled to a second voltage terminal;
- the resistive device is directly coupled to the output node, an output terminal of the first amplifier and the first voltage terminal;
- the regulator transistor is directly coupled to the output terminal of the first amplifier;
- the first capacitor is directly coupled to the second input terminal; and
- the resistive device further comprises:
- a first negative threshold transistor;
- a first transistor coupled in series with the first negative threshold transistor; and
- a second transistor coupled in series with a second negative threshold transistor, the series coupling of the first negative threshold transistor and the first transistor being coupled in parallel with the series coupling of the second negative threshold transistor and the second transistor.

2. The low dropout regulator of claim 1 wherein the first amplifier comprises:

- i) a first input terminal for receiving a reference voltage;
- ii) the second input terminal for receiving the feedback voltage; and
- iii) the output terminal; and
- wherein the regulator transistor comprises a gate terminal coupled to the output terminal of the first amplifier.

3. The low dropout regulator of claim 1, wherein the first capacitor is configured to contribute to the stability of the low dropout regulator during operation.

4. The low dropout regulator of claim 3, wherein the first capacitor is configured to contribute to the stability of the low dropout regulator during operation by cancelling a pole at the second input terminal of the first amplifier.

5. The low dropout regulator of claim 1 further comprising a load device coupled to the output node, the load current being provided across the load device during operation.

6. The low dropout regulator of claim 5, wherein the load device comprises a first terminal coupled to the output node and a second terminal coupled to the second voltage terminal.

7. The low dropout regulator of claim 1, wherein the first negative threshold transistor comprises a first terminal coupled to the output node and a second terminal coupled to a first terminal of the first transistor.

8. The low dropout regulator of claim 7, wherein the first transistor comprises a second terminal coupled to a first voltage terminal and a gate terminal coupled to the output terminal of the first amplifier.

9. A low dropout regulator for providing an output voltage, the low dropout regulator comprising:

- a resistive device configured to contribute to stability of the low dropout regulator during operation and to have a resistance that is dependent on a load current;
- a first resistive element;
- a second resistive element;

a first amplifier;
a regulator transistor; and
a first capacitor,
wherein:
the first resistive element and the second resistive element are coupled in series;
the regulator transistor and the first resistive element are coupled at an output node for providing the output voltage;
the first resistive element and the second resistive element are coupled at a feedback node for providing a feedback voltage, the feedback node being coupled to a second input terminal of the first amplifier;
the regulator transistor is coupled to a first voltage terminal;
the second resistive element is coupled to a second voltage terminal;
the resistive device is directly coupled to the output node, an output terminal of the first amplifier and the first voltage terminal;
the regulator transistor is directly coupled to the output terminal of the first amplifier;
the first capacitor is directly coupled to the second input terminal;
the first amplifier comprises:
i) a first input terminal for receiving a reference voltage;
ii) the second input terminal for receiving the feedback voltage; and
iii) the output terminal;
the regulator transistor comprises a gate terminal coupled to the output terminal of the first amplifier;
the resistive device comprises further a first negative threshold transistor;
the resistive device further comprises a first transistor coupled in series with the first negative threshold transistor;
the first negative threshold transistor comprises a first terminal coupled to the output node and a second terminal coupled to a first terminal of the first transistor;
the first transistor comprises a second terminal coupled to a first voltage terminal and a gate terminal coupled to the output terminal of the first amplifier; and
wherein the resistive device comprises a second transistor coupled in series with a second negative threshold transistor, the series coupling of the first negative threshold transistor and the first transistor being coupled in parallel with the series coupling of the second negative threshold transistor and the second transistor.

10. The low dropout regulator of claim 9, wherein the second negative threshold transistor comprises a first terminal coupled to the output node and a second terminal coupled to a first terminal of the second transistor.

11. The low dropout regulator of claim 10, wherein the second transistor comprises a second terminal coupled to the first voltage terminal and a gate terminal coupled to the output terminal of the first amplifier.

12. The low dropout regulator of claim 11, wherein the second terminal of the second negative threshold transistor is coupled to the first terminal of the second transistor via a third resistive element and/or the first terminal of the second transistor is coupled to the output node via a fourth resistive element.

13. A method of providing an output voltage, comprising:
providing a low dropout regulator for providing an output voltage, wherein the low dropout regulator comprises:
a resistive device configured to contribute to stability of the low dropout regulator during operation and to have a resistance that is dependent on a load current;
a first resistive element;
a second resistive element;
a first amplifier;
a regulator transistor; and
a first capacitor,
wherein:
the first resistive element and the second resistive element are coupled in series;
the regulator transistor and the first resistive element are coupled at an output node for providing the output voltage;
the first resistive element and the second resistive element are coupled at a feedback node for providing a feedback voltage, the feedback node being coupled to a second input terminal of the first amplifier;
the regulator transistor is coupled to a first voltage terminal;
the second resistive element is coupled to a second voltage terminal;
the resistive device is directly coupled to the output node, an output terminal of the first amplifier and the first voltage terminal;
the resistive device comprises a first negative threshold transistor;
the regulator transistor is directly coupled to the output terminal of the first amplifier;
the first capacitor directly coupled to the second input terminal; and
the first capacitor is directly coupled to the first negative threshold transistor.

14. The low dropout regulator of claim 1, wherein the first capacitor is directly coupled between the second input terminal and the resistive device.

* * * * *